US012797887B2

(12) United States Patent
Bartholomew et al.

(10) Patent No.: US 12,797,887 B2
(45) Date of Patent: Nov. 17, 2026

(54) APPARATUS FOR PROMOTING CRAZING OF A POLYMER MATERIAL

(71) Applicant: Battelle Memorial Institute, Columbus, OH (US)

(72) Inventors: John Bartholomew, Hilliard, OH (US); Ryan Daly, Columbus, OH (US); Tim Allen, Johnstown, OH (US); Amy Marie Heintz, Pacific Grove, CA (US)

(73) Assignee: Battelle Memorial Institute, Columbus, OH (US)

( * ) Notice: Subject to any disclaimer, the term of this patent is extended or adjusted under 35 U.S.C. 154(b) by 0 days.

(21) Appl. No.: 18/791,866

(22) Filed: Aug. 1, 2024

(65) Prior Publication Data

US 2025/0041892 A1 Feb. 6, 2025

Related U.S. Application Data

(60) Provisional application No. 63/517,357, filed on Aug. 3, 2023.

(51) Int. Cl.

*B05C 1/08* (2006.01)
*B05C 13/02* (2006.01)
*B05D 1/28* (2006.01)

(52) U.S. Cl.

CPC ............ *B05C 1/0808* (2013.01); *B05C 13/02* (2013.01); *B05D 1/28* (2013.01)

(58) Field of Classification Search

CPC .................................................. B05C 1/08–12
See application file for complete search history.

(56) References Cited

U.S. PATENT DOCUMENTS

| | | | | |
|---|---|---|---|---|
| 5,208,098 | A * | 5/1993 | Stover | B32B 7/12 442/398 |
| 2005/0241573 | A1* | 11/2005 | Ogawa | B41F 9/063 118/204 |
| 2012/0183681 | A1* | 7/2012 | Umebara | B05C 1/0808 118/200 |
| 2015/0034237 | A1* | 2/2015 | Biggs | B05D 1/265 156/719 |

* cited by examiner

*Primary Examiner* — Dah-Wei D. Yuan
*Assistant Examiner* — Stephen A Kitt
(74) *Attorney, Agent, or Firm* — Secant IP, PLLC; Steven J. Grossman

(57) ABSTRACT

An apparatus for promoting crazing of a polymer material. More specifically, the present invention relates to an apparatus for promoting crazing of a polymer material by continuous application of a solvent and a tensile force on the polymer material to increase the polymer surface area.

13 Claims, 3 Drawing Sheets

APPARATUS FOR PROMOTING CRAZING OF A POLYMER MATERIAL

STATEMENT REGARDING FEDERALLY SPONSORED RESEARCH OR DEVELOPMENT

This invention was made with government support under Contract No. HR001120C0118 awarded by the Department of Defense. The government has certain rights in the invention.

FIELD

The present invention relates to an apparatus for promoting crazing of a polymer material. More specifically, the present invention relates to an apparatus for promoting crazing of a polymer material by continuous application of a solvent and a tensile force on the polymer material to increase the polymer surface area.

BACKGROUND

Crazing is the creation of a network of surface discontinuities. For various reasons, such as material testing, manufacturers may seek to promote crazing of polymer films. Crazing can be promoted through various processes. For example, crazing can be promoted by exposing a material to an external tensile force and/or applying a solvent.

DESCRIPTION OF PREFERRED EMBODIMENTS

The present invention relates to an apparatus for continuously promoting crazing of a polymer material. Crazing is reference to the development of surface discontinuities, which result in an increase in the polymer material surface area. Preferably, the apparatus for promoting crazing of a polymer material comprises a first assembly that continuously applies a selected solvent to a surface of the polymer material. The apparatus also includes a second assembly that receives the polymer material now having solvent at the surface. The second assembly then continuously applies a tensile force to the polymer material having solvent at the surface thereby leading to crazing. The second assembly then conveys the polymer material out of the apparatus and provides a polymer material now having an increased surface area.

Figure 1:
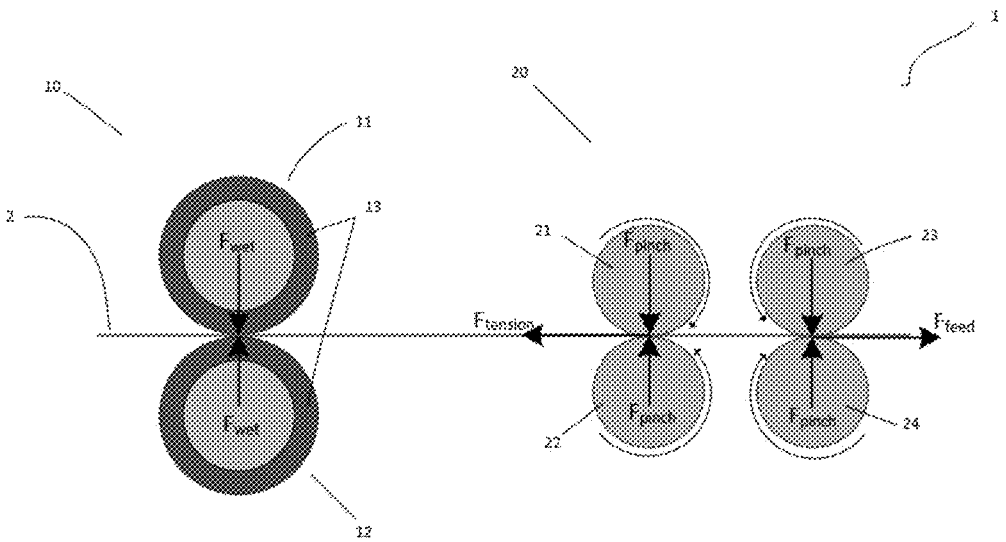

FIG. 1 depicts a preferred embodiment of the disclosed apparatus 1 where the first assembly 10 preferably has two substantially parallel wetting rollers 11, 12, more preferably wetting rollers with an outer surface 13 comprising an absorbent material, even more preferably an outer surface 13 of wetting rollers 11, 12 comprising a neoprene open-cell foam. The first assembly 10 comprising two wetting rollers 11, 12 may further be configured to receive polymer material 2 between said wetting rollers 11, 12. Wetting rollers 11, 12 may preferably be further configured to exert a force $F_{wet}$ perpendicular to the surface of polymer material 2 which may provide contact between polymer material 2 and wetting rollers 11, 12. Wetting force $F_{wet}$ may preferably be in the range of 0.1 N to 50.0 N, more preferably in the range of 0.5 N to 10 N, including all values and increments therein. Wetting rollers 11, 12 may therefore apply a selected solvent to the surface of polymer material 2 upon receiving the polymer material 2 between the absorbent surfaces 13 of wetting rollers 11, 12, where the wetting rollers are saturated with a selected solvent. This then provides what may be described as a wetted polymer material. The solvent that is selected is one that is identified to have the ability to selectively dissolve a portion of a selected polymer material surface. More preferably, wetting rollers 11, 12 may apply an organic alcohol, such as ethanol, propanol, isopropanol, or butanol to the surface of polymer material 2. Other solvents contemplated herein include glycols, organic ketones, hydrocarbon solvents (e.g. toluene or xylene), organic based acid solvents (e.g. acetic acid), amide type solvents such as dimethyl formamide (DMF) and dimethyl acetamide (DMAc).

The preferred embodiment shown in FIG. 1, also depicts the second assembly 20 that preferably comprises two sets of substantially parallel tensioning rollers 21, 22, 23, 24. The first set of tensioning rollers 21, 22 may preferably be configured to receive the polymer material 2 between the first set of tensioning 21, 22 rollers from the first assembly 10. The second set of tensioning rollers 23, 24 may preferably be configured to receive the now wetted polymer material 2 between the second set of tensioning rollers 23, 24 from the first set of tensioning rollers 21, 22. A pinching force $F_{pinch}$ is then exerted on the polymer material 2 between the first set of tensioning rollers 21, 22 and on the wetted polymer material 2 between the second set of tensioning rollers 23, 24. Preferably, the pinching force $F_{pinch}$ may be in the range of 100 Newtons (N) to 900 N, more preferably in the range of 500 N to 700 N, including all values and increments therein.

The two sets of tensioning rollers 21, 22, 23, 24 may then preferably be configured to continuously apply a tensile force on the polymer material 2. The first set of tensioning rollers 21, 22 may be configured to exert tension force $F_{tension}$ on the polymer material 2 in a first direction, where the first direction is away from the second set of tensioning rollers 23, 24. More preferably, the first set of tensioning rollers 21, 22 may exert tension force $F_{tension}$ on the polymer material 2. This can be achieved by rotating rollers 21 and 22 in opposite directions to corresponding rollers 23 and 24. As shown, roller 21 rotates clockwise, roller 22 rotates counter-clockwise, roller 23 rotates counter-clockwise, and roller 24 rotated clockwise. As a result the wetted polymer material experiences a tensile force. Namely, a tensile force due to the tension force ($F_{tension}$) that is applied opposite to the feed force ($F_{feed}$) as shown in FIG. 1. The tension force is also adjusted relative to the feed force so that the wetted polymer continues to feed and emerge from the apparatus 1.

Expanding on the above, the linear velocity of the first set of tensioning rollers 21, 22, at the point each of the tensioning rollers of the first set 21, 22 contact the polymer material 2, has substantially the same directionality as the tension force $F_{tension}$. Even more preferably, the rotation of one or both of the tensioning rollers in the first set 21, 22 may be driven by a motor. The second set of parallel tensioning rollers 23, 24 may similarly be configured to exert a feed force $F_{feed}$ on polymer material 2 in a second direction, where the second direction may preferably be away from the first set of parallel tensioning rollers 21, 22. More preferably, the second set of parallel tensioning rollers 23, 24 may exert tension force $F_{feed}$ on the polymer material 2 by rotating in opposing directions where the linear velocity vector of the second set of tensioning rollers 23, 24, at the point each of the tensioning rollers of the second set 23, 24 contact the polymer material 2, has substantially the same directionality as the feed force $F_{feed}$. Even more preferably, the rotation of one or both of the tensioning rollers in the second set 23, 24 may be driven by a motor.

Preferably, $F_{tension}$ may be in the range of 50 Newtons (N) to 500 N, more preferably 200N to 300 N, including all values and increments therein. $F_{feed}$ may preferably be substantially equal and opposite $F_{tension}$. Preferably, the surface of tensioning rollers 21, 22, 23, 24 of the second assembly 20 may be textured where a texture refers to a surface having one or more raised features. More preferably, the surface of tensioning rollers 21, 22, 23, 24 may be knurled where knurled refers to a surface having a series of ridges. Between the surface of the tensioning rollers 21, 22, 23, 24 and the surface of the polymer material 2, there may be: (1) a friction coefficient preferably in the range of 0.1 to 0.3, more preferably in the range of 0.15 to 0.25; and (2) a normal force, perpendicular to the surface of the polymer material 2, per tensioning roller 21, 22, 23, 24 of the second assembly 20, preferably in the range of 200 N to 1000 N, more preferably 600 N to 700 N, including all values and increments therein.

The second assembly 20 may preferably be configured to convey polymer material 2 through and out the apparatus 1. More preferably, the second assembly 20 may be configured to convey polymer material 2 through the apparatus 1 at a feed rate in the range of 25 mm/s to 100 mm/s, more preferably 40 mm/s to 60 mm/s. The tensioning rollers 21, 22, 23, 24 of the second assembly 20 may preferably be metal, more preferably stainless steel. The tensioning rollers 21, 22, 23, 24 of the second assembly 20 may also have a diameter preferably in the range of 5 mm to 25 mm, more preferably in the range of 10 mm to 20 mm, including all values and increments therein.

The polymer material 2 may have a width preferably in the range of 25.4 mm to 254.0 mm, more preferably in the range of 50.8 mm to 127.0, and a thickness preferably in the range of 0.10 mm to 0.50 mm, more preferably in the range of 0.15 mm to 0.30 mm. The polymer material 2 may preferably be a thermoplastic polymer material, including polyolefins such as polyethylene and polypropylene, polystyrene, poly(vinyl chloride), polyester, polyamide, polycarbonate, acrylic polymer, cellulosic polymer.

Figure 2:
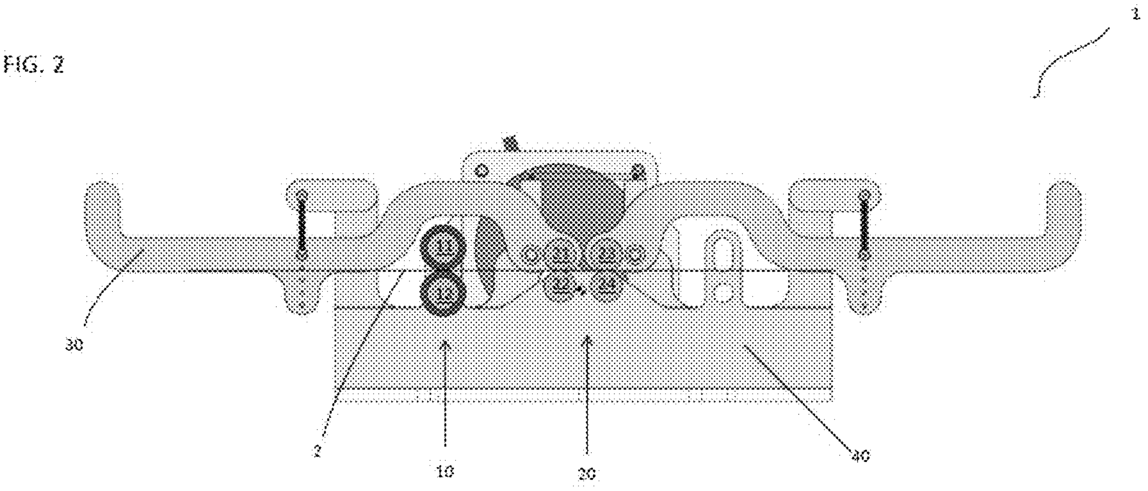

A cross-section of a preferred embodiment of the disclosed apparatus 1 is shown in FIG. 2. As shown in FIG. 2, the apparatus comprises the first assembly 10 comprising a pair of wetting rollers 11, 12 and the second assembly 20 comprising two sets of tensioning rollers 21, 22, 23, 24 of the embodiment depicted in FIG. 1.

Further, the embodiment shown in FIG. 2 may preferably have two or more lever arms 30 and a base 40. The top tensioning roller of the first set 21 and the top tensioning roller of the second set 23 may each preferably be rotatably coupled to one or more lever arms 30. The bottom tensioning roller of the first set 22 and the bottom tensioning roller of the second set 24 and wetting rollers 11, 12 may preferably be rotatably coupled to said base 40.

Figure 3:
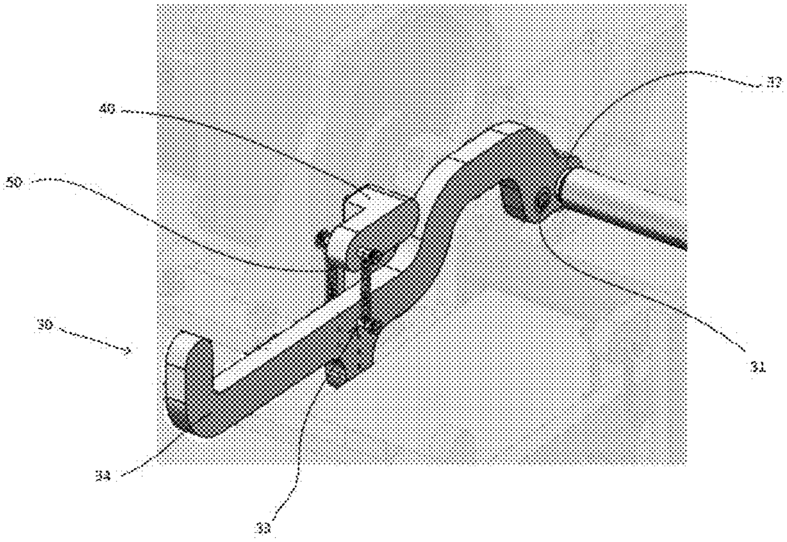

FIG. 3 depicts an exemplary lever arm 30 of the preferred embodiment in FIG. 2. As shown in FIG. 3, lever arm 30 may preferably have a pivot point 31, a tension roller attachment location 32, one or more spring attachment locations 33, and a distal end 34. Lever arms 30 may preferably be rotatably attached to base 40 at pivot point 31. A top tension roller of the first set 21 and a top tension roller of the second set 23 may each be rotatably coupled to a lever arm 30 the tension roller attachment location 32 which may preferably be located along lever arm 30 on one side of pivot point 31. Distal end 34 may be located at the end of lever arm 30 on the opposite side of pivot point 31 as the tension roller attachment location 33. The one or more spring attachment locations 33 may preferably be located along lever arm 30 between pivot point 31 and distal end 34. Lever arm 30 may preferably be mechanically engaged with a first end of at least one spring 50 at one of the spring attachment location(s) 33. A second end of the spring 50 may preferably be mechanically engaged with base 40.

The one or more springs 50 may preferably be made of Music Wire and may have a spring constant preferably in the range of 0-20 lbs/in, more preferably in the range of 8-12 lbs/in. Lever arm 30 may preferably have one or more spring attachment locations 33 where each spring attachment location 33 has a distance from the point at which the second end of the spring 50 may be mechanically engaged with the base 40. The location of the spring attachment location 33 with the shortest distance from the location at which the second end of the spring 50 may be mechanically engaged with the base 40 may be preferably in the range of 3 mm to 70 mm, more preferably in the range of 28 mm to 52 mm, including all values and increments therein Lever arm 30 may preferably have a quantity of spring attachment locations 33 preferably in the range of 1 to 10, more preferably in the range of 4 to 6. The increase in the distance between the location at which the second end of the spring 50 may be mechanically engaged with the base 40 and each consecutive spring attachment location 33 may be preferably in the range of 1.0 mm to 13.0 mm, more preferably 2.0 mm to 4.0 mm.

Figure 4A:
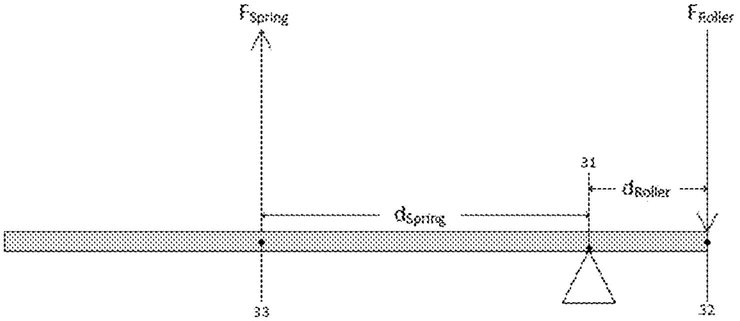
Figure 4B:
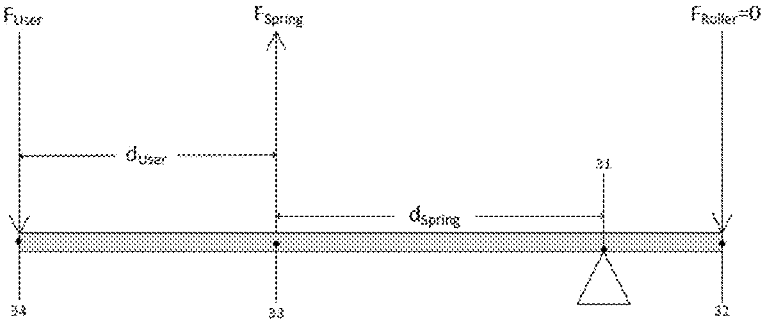

FIGS. 4*a* and 4*b* are force diagram depicting the forces exerted on and by lever arm 30. As shown in force diagrams in FIGS. 4*a* and 4*b*, lever arm 30 may preferably act as a lever wherein the pivot point 31 is the fulcrum. FIG. 4*a* depicts the forces exerted on and by lever arm 30 when the pinch force $F_{pinch}$, depicted in FIG. 1, is greater than zero. The pinch force $F_{pinch}$, depicted in FIG. 1, of the tension roller on the polymer material 2 may preferably be the roller force $F_{Roller}$ applied by lever arm 30 at tension roller location 32 further relayed by the tension roller to the polymer material 2. As further depicted in FIG. 4*a*, a combination of one or more springs 30 may preferably exert a tensile force $F_{spring}$ on lever arm 30 at the spring attachment location 33 and preferably causing lever arm 30 to apply reciprocating force $F_{Roller}$ on a tension roller at tension roller attachment location 32. The roller force $F_{Roller}$ may be substantially equal to the force applied by combination of the one or more springs $F_{spring}$ on the lever arm 30 at the spring attachment location 33 multiplied by the mechanical advantage of the one or more springs. The mechanical advantage of the springs refers to the ratio of the distance between the spring attachment location and the pivot point $d_{spring}$ to the distance between the tension roller attachment location and the pivot point $d_{Roller}$. The mechanical advantage of the springs 50 may be preferably in the range of 2 to 15, more preferably in the range of 7 to 9.

FIG. 4*b*, depicts the forces exerted on and by lever arm 30 when the pinch force $F_{pinch}$, depicted in FIG. 1, is less than or equal to zero. By removing the pinch force $F_{pinch}$ between the tension roller and the polymer film material 2 the user may disengage the polymer film material 2 from the tension rollers. The lever arm 30 may, therefore, preferably be configured to provide the distal end 34 as a handle for the user. A user applied force $F_{User}$ at the distal end 34 that is at least equal to the spring force $F_{spring}$ multiplied by the mechanical advantage of the user may counterattack the spring force $F_{spring}$ on the lever arm 30 thereby eliminating the reciprocating roller force $F_{Roller}$ exerted by the lever arm 30 at the tension roller attachment location 32 and, likewise, eliminate pinch force $F_{pinch}$. The mechanical advantage of the user refers to the ratio of the distance between the user applied force on the distal end of the lever arm and the pivot point $d_{user}$ to the distance between the spring attachment point and the pivot point $d_{spring}$. The mechanical advantage of the user may be preferably in the range of 105% to 200% of the mechanical advantage of the spring, more preferably in the range of 110% to 130% of the mechanical advantage of the spring.

Figure 5:
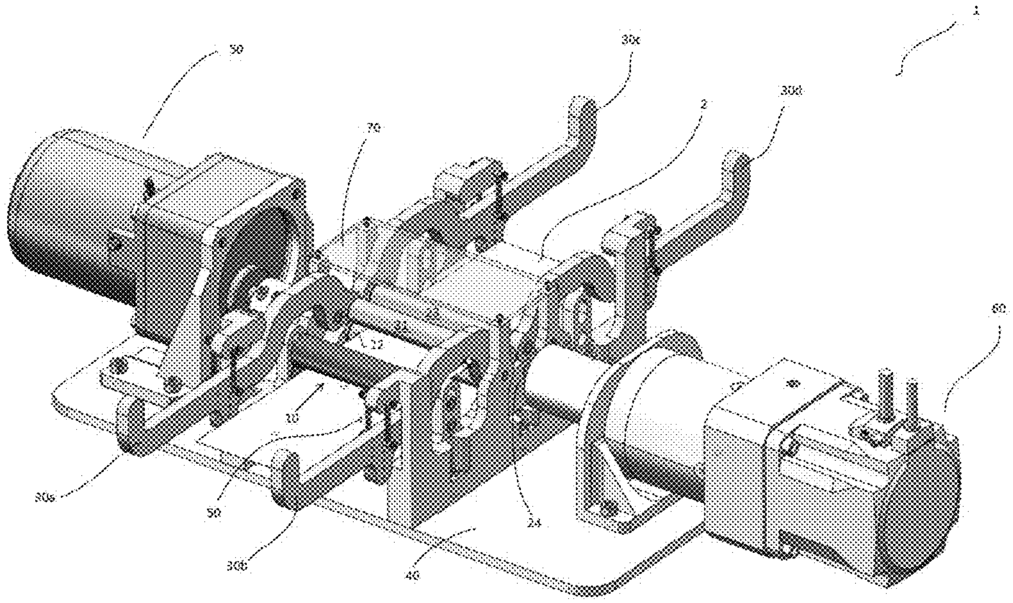

FIG. 5 depicts the full perspective view of the embodiments shown in FIGS. 2 & 3. As shown in FIG. 5, the apparatus 1 may have four lever arms 30*a*, 30*b*, 30*c*, 30*d*. As also shown in FIG. 4, preferably each of the four lever arms 30*a*, 30*b*, 30*c*, 30*d* may be mechanically engaged by two springs 50. The top tension roller of the first set of tension rollers 21 may preferably be rotatably attached to lever arms 50*a*, 50*b* and the top tension roller of the second set 23 may preferably be rotatably attached to lever arms 50*c*, 50*d*.

FIG. 5 further depicts a first motor 50 mechanically coupled to a first end of the bottom tension roller of the first set 22 where a second end of the bottom tension roller of the first set 22 is rotatably attached to base 40. The first motor 50 may preferably be a torque motor. First motor 50 may have a gear ratio preferably in the range of 10:1 to 20:1, more preferably in the range of 12:1 to 18:1; a minimum torque output preferably in the range of 0.5 N-m to 5.0 N-m, more preferably in the range of 1.5 N-m to 2.5 N-m; and a minimum speed preferably in the range of 30 rpm to 90 rpm, more preferably in the range of 50 rpm to 70 rpm. Also shown in FIG. 5, a second motor 60 may preferably be mechanically coupled to a first end of the bottom tension roller of the second set 24 where a second end of the bottom tension roller of the second set 24 may preferably be rotatably attached to base 40. The second motor 60 may preferably be a drive motor, more preferably a stepper motor with an encoder. Second motor 60 may have a gear ratio preferably in the range of 10:1 to 30:1, more preferably in the range of 15:1 to 25:1; a minimum torque output preferably in the range of 0.5 N-m to 5.0 N-m, more preferably in the range of 1.5 N-m to 2.5 N-m; and a minimum speed preferably in the range of 30 rpm to 90 rpm, more preferably in the range of 50 rpm to 70 rpm.

FIG. 5 further shows a safety shield 70 which may be mounted to base 40 proximal to tensioning rollers 21, 22, 23, 24. Preferably, safety shield 70 is positioned substantially over tensioning rollers 21, 22, 23, 24. Preferably, safety shield 70 is polycarbonate. Safety shield 70 may have a thickness preferably in the range of 0.10 in to 2.00 in, more preferably in the range of 0.25 in to 0.50 in.

What is claimed is:

1. An apparatus for promoting crazing of a polymer material, comprising:

- a first assembly that continuously applies a selected solvent to a surface of said polymer material that provides a wetted polymer material; and
- a second assembly that receives said wetted polymer material from said first assembly and applies a tensile force to said wetted polymer material and continuously conveys said wetted polymer material through said apparatus;
- wherein said second assembly comprises a first set of tensioning rollers configured to receive said wetted polymer material between said first set of tensioning rollers, and a second set of tensioning rollers configured to receive said wetted polymer material between said second set of tensioning rollers, said first set of tensioning roller sand said second set of tensioning rollers being arranged consecutively;
- wherein said first set of tensioning rollers is configured to apply a tensile force on the wetted polymer material in a first direction, where the first direction is away from the second set of tensioning rollers; and
- wherein said second set of tensioning rollers is configured to apply a feed force on the wetted polymer material in a second direction, where the second direction is away from the first set of tensioning rollers.

2. The apparatus of claim 1 wherein said first assembly comprises two substantially parallel wetting rollers.

3. The apparatus of claim 2 wherein said wetting rollers are configured to have releasably absorbent surfaces.

4. The apparatus of claim 1 wherein said solvent is selected from the group consisting of an organic alcohol, glycols, organic ketones, hydrocarbon solvents, organic based acids, amide solvents, and dimethyl acetamide.

5. The apparatus of claim 1 wherein said polymer material is a thermoplastic material.

6. The apparatus of claim 1 wherein said polymer material is selected from the group consisting of polyolefins, polystyrene, poly(vinyl chloride), polyester, polyamide, polycarbonate, acrylic polymer and cellulosic polymer.

7. The apparatus of claim 1 wherein said apparatus conveys said polymer material through said apparatus at a feed rate in the range of 25 mm/s to 100 mm/s.

8. The apparatus of claim 1, wherein each tensioning roller of said first set of tensioning rollers is configured to rotate so as to have a linear velocity vector extending from a location where each tensioning roller of said first set of tensioning rollers contacts said wetted polymer material, wherein said linear velocity vector of each tensioning roller of said first set of tensioning rollers extends in said first direction.

9. The apparatus of claim 8, wherein each tensioning roller of said second set of tensioning rollers is configured to rotate so as to have a linear velocity vector extending from a location where each tensioning roller of said second set of tensioning rollers contacts said wetted polymer material, wherein said linear velocity vector of each tensioning roller of said second set of tensioning rollers extends in said second direction.

10. The apparatus of claim 1 wherein said first assembly that continuously applies a selected solvent to the surface of said polymer material comprises two wetting roller that exert a wetting force Fwet in the range of 0.1 N to 50.0 N.

11. The apparatus of claim 1 wherein said first set of tensioning rollers apply a tensile force in the range of 50 N to 500 N.

12. The apparatus of claim 11 wherein said second set of tensioning rollers apply a feed force that is equal and opposite to said tensile force.

13. The apparatus of claim 1 wherein said first set of tensioning rollers includes a top tensioning roller and bottom tensioning roller and said second set of tensioning rollers include a top tensioning roller and bottom tensioning roller, further including two lever arms and a base, wherein said top tensioning roller of said first set of tensioning roller and said top tensioning roller of said second set of tensioning rollers are each rotatably coupled to one of said two lever arms.

* * * * *